(12) United States Patent
Onishi et al.

(10) Patent No.: US 8,524,160 B2
(45) Date of Patent: Sep. 3, 2013

(54) CATALYST SEPARATION SYSTEM

(75) Inventors: Yasuhiro Onishi, Tokyo (JP); Eiichi Yamada, Yokohama (JP)

(73) Assignees: Japan Oil, Gas and Metals National Corporation, Tokyo (JP); Inpex Corporation, Tokyo (JP); JX Nippon Oil & Energy Corporation, Tokyo (JP); Japan Petroleum Exploration Co., Ltd., Tokyo (JP); Cosmo Oil Co., Ltd., Tokyo (JP); Nippon Steel Engineering Co., Ltd., Tokyo (JP)

( * ) Notice: Subject to any disclaimer, the term of this patent is extended or adjusted under 35 U.S.C. 154(b) by 0 days.

(21) Appl. No.: 13/138,637

(22) PCT Filed: Mar. 1, 2010

(86) PCT No.: PCT/JP2010/001364
§ 371 (c)(1),
(2), (4) Date: Sep. 13, 2011

(87) PCT Pub. No.: WO2010/106744
PCT Pub. Date: Sep. 23, 2010

(65) Prior Publication Data
US 2012/0003127 A1  Jan. 5, 2012

(30) Foreign Application Priority Data
Mar. 19, 2009 (JP) .................................. 2009-068829

(51) Int. Cl.
*B01J 8/20* (2006.01)
*B01J 8/22* (2006.01)

(52) U.S. Cl.
USPC ............ 422/140; 422/147; 422/212; 518/700

(58) Field of Classification Search
USPC .................. 422/140, 147, 211, 212; 518/700
See application file for complete search history.

(56) References Cited

U.S. PATENT DOCUMENTS

| 3,692,178 | A | * | 9/1972 | Reece | 210/798 |
| 5,844,006 | A | * | 12/1998 | Jager et al. | 518/700 |
| 2005/0080149 | A1 | | 4/2005 | Degeorge et al. | |

FOREIGN PATENT DOCUMENTS

| JP | 2006-022283 | | 1/2006 |
| JP | 2007-516065 | | 6/2007 |
| WO | WO 9416807 A1 | * | 8/1994 |
| WO | 2005/005038 | | 1/2005 |
| WO | WO 2007041726 A1 | * | 4/2007 |

OTHER PUBLICATIONS

International Search Report dated Mar. 23, 2010 issued in corresponding PCT Application No. PCT/JP2010/001364.
Eurasian Office Action dated Mar. 28, 2013, issued in corresponding Eurasian Application No. 201171097, with an English translation thereof.

* cited by examiner

*Primary Examiner* — Jennifer A Leung
(74) *Attorney, Agent, or Firm* — Kenyon & Kenyon LLP

(57) ABSTRACT

A catalyst separation system is provided with: a reactor where hydrocarbons are synthesized by a chemical reaction of a synthesis gas including carbon monoxide gas and hydrogen gas as main components, and a catalyst slurry having solid catalyst particles suspended in a liquid; filters which separate the hydrocarbons and the catalyst slurry; and a gas-liquid separator which separates the liquid hydrocarbons flowing out of the filter into gas hydrocarbons and liquid hydrocarbons.

5 Claims, 3 Drawing Sheets

US 8,524,160 B2

CATALYST SEPARATION SYSTEM

TECHNICAL FIELD

The present invention relates to a catalyst separation system which separates liquid hydrocarbons from a catalyst slurry.

This application is a national stage application of International Application No. PCT/JP2010/001364, filed Mar. 1, 2010, which claims priority to Japanese Patent Application No. 2009-68829, filed Mar. 19, 2009, the content of which is incorporated herein by reference.

BACKGROUND ART

As one of the methods for synthesizing liquid fuels from natural gas, a GTL (Gas to Liquid: liquid fuel synthesis) technique of reforming natural gas to produce a synthesis gas including carbon monoxide gas (CO) and hydrogen gas ($H_2$) as main components, synthesizing hydrocarbons using a catalyst with this synthesis gas as a source gas by the Fischer-Tropsch synthesis reaction (hereinafter referred to as "FT synthesis reaction"), and further hydrogenating and refining the hydrocarbons to produce liquid fuel products, such as naphtha (raw gasoline), kerosene, gas oil, and wax, has recently been developed.

The liquid hydrocarbons synthesized by the FT synthesis reaction are separated from the catalyst slurry, which has solid catalyst particles suspended in the liquid hydrocarbons, before being transferred to a refining process in the subsequent process where the hydrocarbons are converted into naphtha, kerosene, etc. Conventionally, as a device to separate liquid hydrocarbons from a catalyst slurry, a method which passes the hydrocarbons through filters is suggested, as described in, for example, Patent Document 1.

CITATION LIST

Patent Literature

[Patent Document 1] Specification of US Patent Application Laid-Open Publication No. 2005-0080149

SUMMARY OF THE INVENTION

Technical Problem

When liquid hydrocarbons are separated from the catalyst slurry as described above, gas hydrocarbons, etc. may be mixed into the liquid hydrocarbons filtered by the filters simply by passing the hydrocarbons through the filters. This is because gas hydrocarbons pass through the filters directly or a portion of the liquid hydrocarbons evaporates as the pressure on the downstream of the filters is reduced. When the hydrocarbons are transferred to the downstream side in a mixed vapor-liquid phase in this way, pressure loss in pipes increases as the volume expands during transfer, and the flow volume of hydrocarbons decreases.

The present invention was made in view of such a problem, and the object thereof is to provide a catalyst separation system capable of minimizing a pressure loss, thereby securing a predetermined flow volume, when the liquid hydrocarbons synthesized by the FT synthesis reaction are separated from the catalyst slurry and transferred downstream.

Solution to the Problem

A catalyst separation system of the present invention includes: a reactor where hydrocarbons are synthesized by a chemical reaction of a synthesis gas including carbon monoxide gas and hydrogen gas as main components, and a catalyst slurry having solid catalyst particles suspended in a liquid; filters which separate the hydrocarbons and the catalyst slurry; and a gas-liquid separator which separates the liquid hydrocarbons flowing out of the filters into gas hydrocarbons and liquid hydrocarbons.

Additionally, in the above catalyst separation system, the chemical reaction may be a Fischer-Tropsch synthesis reaction.

According to this invention, hydrocarbons are synthesized by the chemical reaction of the synthesis gas and the catalyst slurry within the reactor. The catalyst slurry is separated from the synthesized hydrocarbons by the filters, and transferred to the gas-liquid separator downstream. Although gas hydrocarbons are also included in the hydrocarbons from which the catalyst slurry has been separated by the filters, the hydrocarbons are separated into gas hydrocarbons and liquid hydrocarbons when being transferred to the gas-liquid separator. Since the hydrocarbons are separated into gas and liquid in this way, the gas hydrocarbons and the liquid hydrocarbons can be transferred separately when being further transferred downstream from the gas-liquid separator. Accordingly, pressure loss within a transfer line can be minimized.

Additionally, in the above catalyst separation system, the gas-liquid separator may have a plurality of branch pipes which extend from the filters, and a collecting pipe which collects a fluid which flows through the branch pipes, and has a larger diameter than the branch pipes.

According to this invention, the liquid hydrocarbons separated by the filters are transferred to the collecting pipe from the branch pipes in a state where the gas hydrocarbons are included. Since the collecting pipe has a larger diameter than the branch pipes, vapor liquid separation will occur even in a portion during transfer to the collecting pipe from the branch pipes, as well as in the collecting pipe. As a result, the gas-liquid separation time can be shortened.

Additionally, in the above catalyst separation system, the collecting pipe may be a ring-shaped header.

According to this invention, when the fluid of the hydrocarbons is transferred to the header from the plurality of branch pipes, the fluid can be transferred to the header under the same conditions, and a smooth flow of the fluid within the header can be achieved.

Additionally, in the above catalyst separation system, the ring-shaped header may be arranged above the filters so that the center thereof is made to coincide with the center of the reactor which houses the filters.

According to this invention, since the ring-shaped header is arranged so that the center thereof is made to coincide with the center of the reactor, an exclusive space for the header and container can be made small, and an apparatus can be made compact. Additionally, since the liquid hydrocarbons including gas hydrocarbons separated by the filters are transferred to the ring-shaped header via the branch pipes, smooth transfer of the liquid hydrocarbons is allowed while performing vapor liquid separation.

Additionally, in the above catalyst separation system, a liquid flowing line through which the liquid hydrocarbons within the ring-shaped header are transferred, and a gas flowing line through which the gas hydrocarbons within the ring-shaped header are transferred may be connected to the ring-shaped header.

According to this invention, among the hydrocarbons separated by the ring-shaped header, the liquid hydrocarbons are transferred by the liquid flowing line, and the gas hydrocarbons are transferred by the gas flowing line. As such, the gas hydrocarbons and the liquid hydrocarbons which have been subjected to vapor liquid separation can be separately transferred downstream.

Advantageous Effects of Invention

According to the catalyst separation system of the present invention, when liquid hydrocarbons synthesized by the FT synthesis reaction are separated from a catalyst slurry and transferred downstream, the hydrocarbons can be first separated into gas hydrocarbons and liquid hydrocarbons, and transferred separately. Thus, it is possible to minimize pressure loss in a transfer path. As a result, a predetermined flow volume can be secured.

DESCRIPTION OF EMBODIMENTS

First Embodiment

Hereinafter, a first embodiment of a catalyst separation system according to the present invention will be described with reference to FIGS. 1 to 3.

First, the overall configuration of a liquid fuel synthesizing system 1 including a catalyst separation system 81 of the present invention will be described with reference to FIG. 1.

Figure 1:
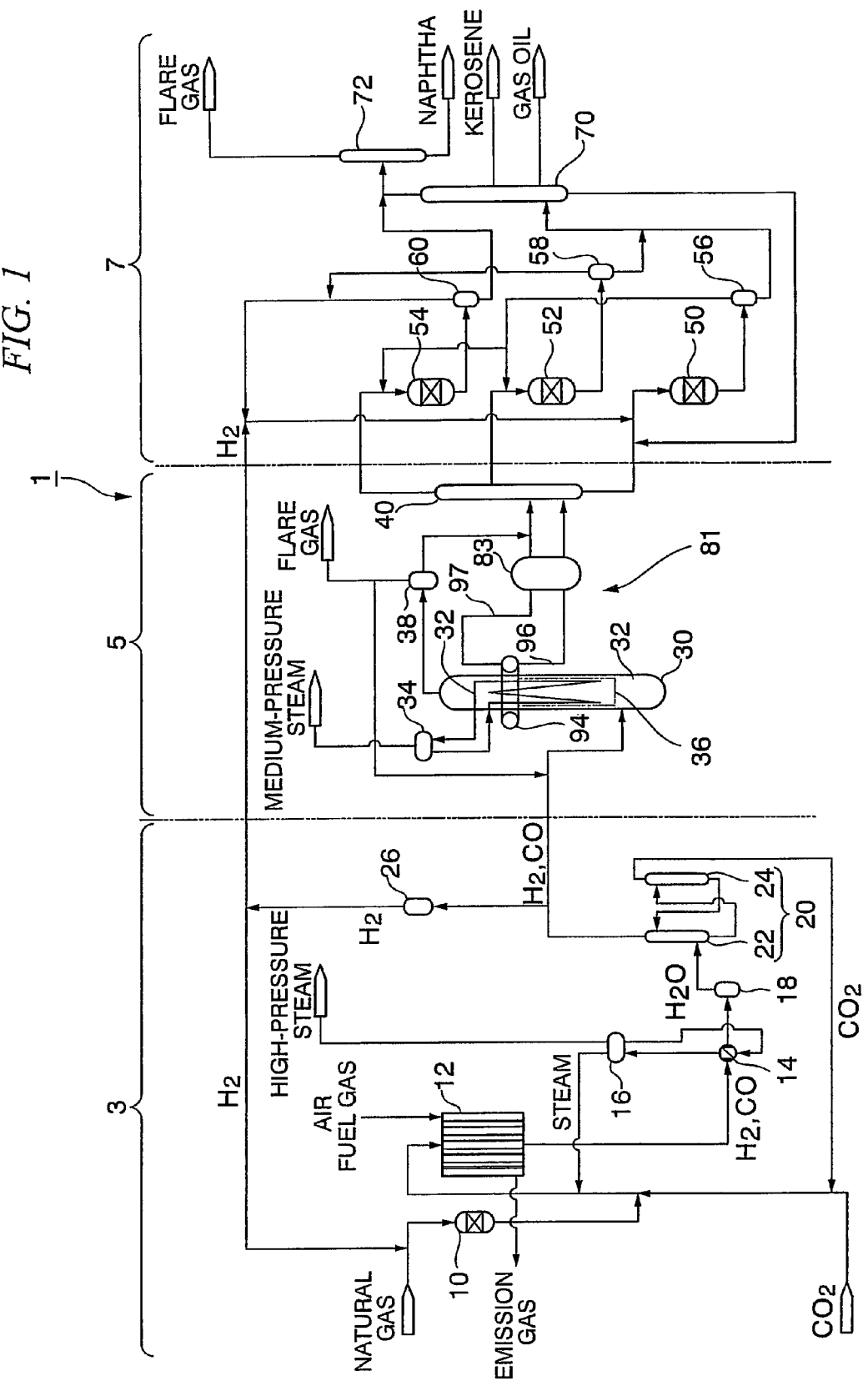
FIG. 1 is a schematic diagram showing the overall configuration of a liquid fuel synthesizing system including a catalyst separation system of a first embodiment of the present invention.
Figure 2:
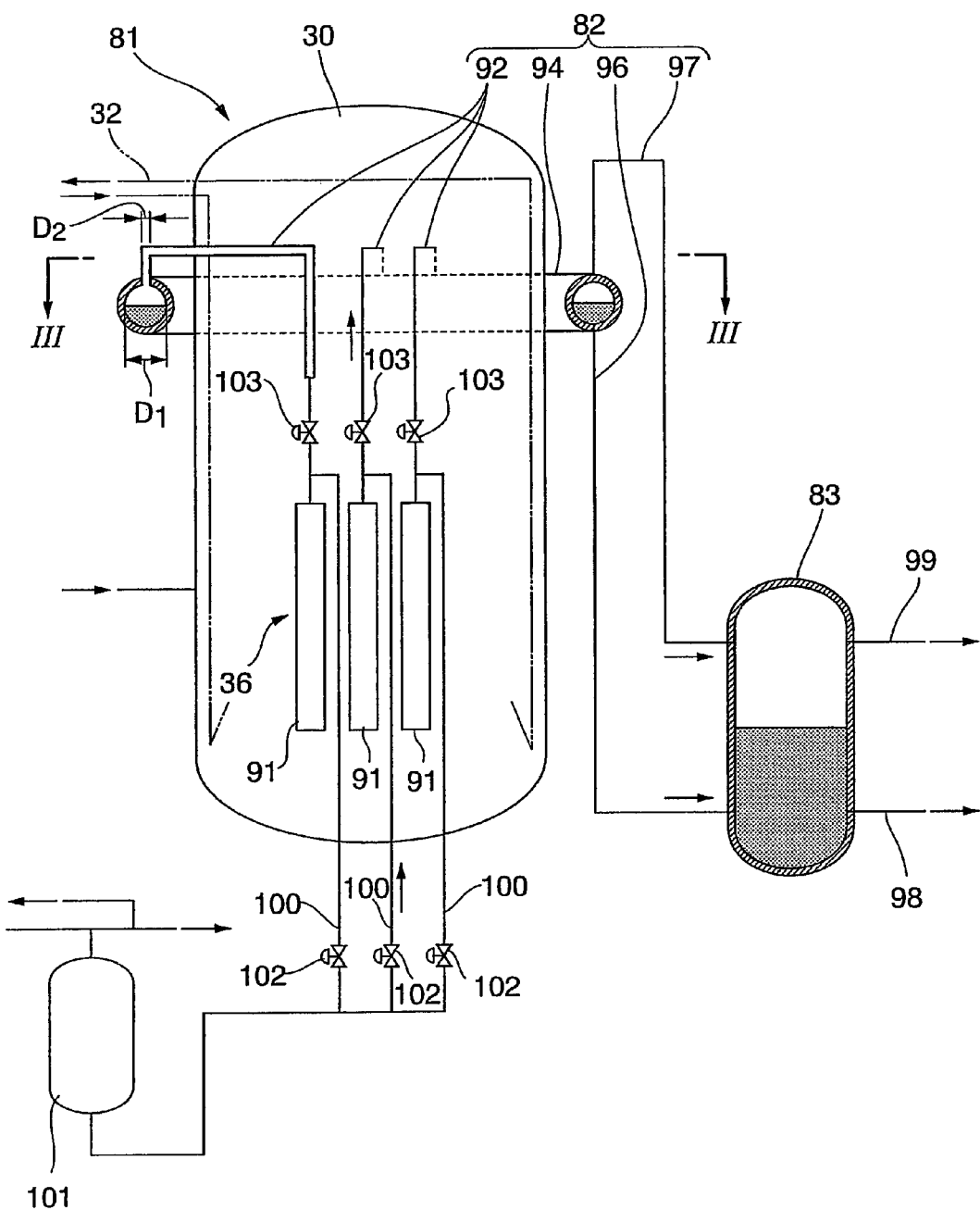
FIG. 2 is a schematic diagram showing the overall configuration of the catalyst separation system of the first embodiment of the present invention.

As shown in FIG. 1, the liquid fuel synthesizing system 1 is a plant facility which carries out the GTL process which converts a hydrocarbon feedstock, such as natural gas, into liquid fuels. This liquid fuel synthesizing system 1 includes a synthesis gas production unit 3, an FT synthesis unit 5, and an upgrading unit 7. The synthesis gas production unit 3 reforms a natural gas, which is a hydrocarbon feedstock, to produce a synthesis gas including a carbon monoxide gas and a hydrogen gas. The FT synthesis unit 5 produces liquid hydrocarbons from the produced synthesis gas by the FT synthesis reaction. The upgrading unit 7 hydrogenates and refines the liquid hydrocarbons produced by the FT synthesis reaction to produce liquid fuel products (naphtha, kerosene, gas oil, wax, etc.). Hereinafter, components of each of these units will be described.

First, the synthesis gas production unit 3 will be described. The synthesis gas production unit 3 mainly includes, for example, a desulfurizing reactor 10, a reformer 12, a waste heat boiler 14, vapor-liquid separators 16 and 18, a $CO_2$ removal unit 20, and a hydrogen separator 26.

The desulfurizing reactor 10 is composed of a hydrodesulfurizer, etc., and removes sulfur components from a natural gas as a feedstock. The reformer 12 reforms the natural gas supplied from the desulfurizing reactor 10, to produce a synthesis gas including a carbon monoxide gas (CO) and a hydrogen gas ($H_2$) as the main components. The waste heat boiler 14 recovers waste heat of the synthesis gas produced in the reformer 12, to produce high-pressure steam. The vapor-liquid separator 16 separates the water heated by the heat exchange with the synthesis gas in the waste heat boiler 14 into a vapor (high-pressure steam) and a liquid. The vapor-liquid separator 18 removes condensate from the synthesis gas cooled down in the waste heat boiler 14, and supplies a gas to the $CO_2$ removal unit 20. The $CO_2$ removal unit 20 has an absorption tower 22 which removes carbon dioxide gas by using an absorbent from the synthesis gas supplied from the vapor-liquid separator 18, and a regeneration tower 24 which desorbs the carbon dioxide gas and regenerates the absorbent including the carbon dioxide gas. The hydrogen separator 26 separates a portion of the hydrogen gas included in the synthesis gas, the carbon dioxide gas of which has been separated by the $CO_2$ removal unit 20. It is to be noted herein that the above $CO_2$ removal unit 20 may not be provided depending on circumstances.

Among them, the reformer 12 reforms a natural gas by using a carbon dioxide and a steam to produce a high-temperature synthesis gas including a carbon monoxide gas and a hydrogen gas as the main components, by a steam and carbon-dioxide-gas reforming method expressed by the following chemical reaction formulas (1) and (2). In addition, the reforming method in this reformer 12 is not limited to the example of the above steam and carbon-dioxide-gas reforming method. For example, a steam reforming method, a partial oxidation reforming method (POX) using oxygen, an autothermal reforming method (ATR) that is a combination of the partial oxidation method and the steam reforming method, a carbon-dioxide-gas reforming method, and the like can also be utilized.

$$CH_4 + H_2O \rightarrow CO + 3H_2 \tag{1}$$

$$CH_4 + CO_2 \rightarrow 2CO + 2H_2 \tag{2}$$

Additionally, the hydrogen separator 26 is provided on a line branching from a pipe which connects the $CO_2$ removal unit 20 or vapor-liquid separator 18 with the bubble column reactor 30. This hydrogen separator 26 can be composed of, for example, a hydrogen PSA (Pressure Swing Adsorption) device which performs adsorption and desorption of hydrogen by using a pressure difference. This hydrogen PSA device has adsorbents (zeolitic adsorbent, activated carbon, alumina, silica gel, etc.) within a plurality of adsorption towers (not shown) which are arranged in parallel. By sequentially repeating processes including pressurizing, adsorption, desorption (pressure reduction), and purging of hydrogen in each of the adsorption towers, a high-purity (for example, about 99.999%) hydrogen gas separated from the synthesis gas can be continuously supplied to a reactor.

In addition, the hydrogen gas separating method in the hydrogen separator 26 is not limited to the example of the pressure swing adsorption method as in the above hydrogen PSA device. For example, the method may be a hydrogen storing alloy adsorption method, a membrane separation method, or a combination thereof.

The hydrogen storing alloy method is, for example, a technique of separating hydrogen gas using a hydrogen storing alloy (TiFe, LaNi$_5$, TiFe$_{0.7-0.9}$, Mn$_{0.3-0.1}$, TiMn$_{1.5}$, etc.) having a property which adsorbs or emits hydrogen by being cooled or heated. By providing a plurality of adsorption towers in which a hydrogen storing alloy is contained, and alternately repeating, in each of the adsorption towers, adsorption of hydrogen by cooling of the hydrogen storing alloy and emission of hydrogen by heating of the hydrogen storing alloy, hydrogen gas in the synthesis gas can be separated and recovered.

Additionally, the membrane separation method is a technique of separating hydrogen gas having excellent membrane permeability out of a mixed gas, using a membrane made of a polymeric material, such as aromatic polyimide. Since this membrane separation method is not accompanied with a phase change, less energy for running is required, and the running cost is low. Additionally, since the structure of a membrane separation device is simple and compact, low facility cost is required and the required area of the facility is also less. Moreover, since there is no driving device in a separation membrane, and a stable running range is wide, there is an advantage in that maintenance and management are easy.

Next, the FT synthesis unit 5 will be described. The FT synthesis unit 5 mainly includes, for example, the bubble column reactor 30, a vapor-liquid separator 34, a separator 36, a vapor-liquid separator 38, and a first fractionator 40.

The bubble column reactor 30, which is an example of a reactor which synthesizes synthesis gas into liquid hydrocarbons, functions as an FT synthesis reactor which synthesizes liquid hydrocarbons from synthesis gas by the FT synthesis reaction. The bubble column reactor 30 is composed of, for example, a bubble column slurry bed type reactor in which a catalyst slurry consisting mainly of catalyst particles and medium oil is contained inside a tower reactor. This bubble column reactor 30 produces gas or liquid hydrocarbons from the synthesis gas by the FT synthesis. In detail, in this bubble column reactor 30, the synthesis gas that is a source gas is supplied as bubbles from a spager at the bottom of the bubble column reactor 30, and passes through the catalyst slurry, and in a suspended state, a hydrogen gas and a carbon monoxide gas undergo a synthesis reaction, as shown in the following chemical reaction formula (3).

(3)

Since this FT synthesis reaction is an exothermic reaction, the bubble column reactor 30, which is a heat exchanger type reactor within which the heat transfer pipe 32 is disposed, is adapted such that, for example, water (BFW: Boiler Feed Water) is supplied as a coolant so that the reaction heat of the above FT synthesis reaction can be recovered as a medium-pressure steam by the heat exchange between the slurry and the water.

The vapor-liquid separator 34 separates the water transferred and heated through the heat transfer pipe 32 disposed within the bubble column reactor 30 into a steam (medium-pressure steam) and a liquid. The separator 36, which is an example of a filter which separates the catalyst slurry and the liquid hydrocarbons, is arranged inside the bubble column reactor 30. The vapor-liquid separator 38 is connected to the top of the bubble column reactor 30 to cool down unreacted synthesis gas and gas hydrocarbon products. The first fractionator 40 distills the liquid hydrocarbons supplied via the separator 36 within the bubble column reactor 30 and the vapor-liquid separator 38, and fractionally distills the liquid hydrocarbons into individual fractions according to boiling points.

Finally, the upgrading unit 7 will be described. The upgrading unit 7 includes, for example, a wax fraction hydrocracking reactor 50, a middle distillate hydrotreating reactor 52, a naphtha fraction hydrotreating reactor 54, vapor-liquid separators 56, 58, and 60, a second fractionator 70, and a naphtha stabilizer 72. The wax fraction hydrocracking reactor 50 is connected to the bottom of the first fractionator 40. The middle distillate hydrotreating reactor 52 is connected to a middle part of the first fractionator 40. The naphtha fraction hydrotreating reactor 54 is connected to the top of the first fractionator 40. The vapor-liquid separators 56, 58 and 60 are provided so as to correspond to the hydrogenation reactors 50, 52 and 54, respectively. The second fractionator 70 separates and refines the liquid hydrocarbons supplied from the vapor-liquid separators 56 and 58 according to boiling points. The naphtha stabilizer 72 distills liquid hydrocarbons of a naphtha fraction supplied from the vapor-liquid separator 60 and the second fractionator 70, to discharge components lighter than butane as flare gas, and to recover components having a carbon number of five or more as a naphtha product.

Next, a process (GTL process) of synthesizing liquid fuels from a natural gas by the liquid fuel synthesizing system 1 configured as above will be described.

A natural gas (the main component of which is $CH_4$) as a hydrocarbon feedstock is supplied to the liquid fuel synthesizing system 1 from an external natural gas supply source (not shown), such as a natural gas field or a natural gas plant. The above synthesis gas production unit 3 reforms this natural gas to produce a synthesis gas (mixed gas including a carbon monoxide gas and a hydrogen gas as main components).

Specifically, first, the above natural gas is supplied to the desulfurizing reactor 10 along with the hydrogen gas separated by the hydrogen separator 26. The desulfurizing reactor 10 hydrogenates and desulfurizes sulfur components included in the natural gas using the hydrogen gas, for example, with a ZnO catalyst. By desulfurizing the natural gas in advance in this way, it is possible to prevent deactivation of catalysts used in the reformer 12, the bubble column reactor 30, etc. by sulfur components.

The natural gas (may also contain a carbon dioxide) desulfurized in this way is supplied to the reformer 12 after the carbon dioxide ($CO_2$) gas supplied from a carbon-dioxide supply source (not shown) and the steam generated in the waste heat boiler 14 are mixed therewith. The reformer 12 reforms a natural gas by using a carbon dioxide and a steam to produce a high-temperature synthesis gas including a carbon monoxide gas and a hydrogen gas as the main components, by a the above steam and carbon-dioxide-gas reforming method. At this time, the reformer 12 is supplied with, for example, a fuel gas for a burner disposed in the reformer 12 and air, and the reaction heat required for the above steam and $CO_2$ reforming reaction that is an endothermic reaction is provided with the heat of combustion of the fuel gas in the burner.

The high-temperature synthesis gas (for example, 900° C., 2.0 MPaG) produced in the reformer 12 in this way is supplied to the waste heat boiler 14, and is cooled down by the heat exchange with the water which flows through the waste heat boiler 14 (for example, 400° C.), thus the waste heat is recovered. At this time, the water heated by the synthesis gas in the waste heat boiler 14 is supplied to the vapor-liquid separator 16. From this vapor-liquid separator 16, a gas component is supplied to the reformer 12 or other external devices as a high-pressure steam (for example, 3.4 to 10.0 MPaG), and water as a liquid component is returned to the waste heat boiler 14.

Meanwhile, the synthesis gas cooled down in the waste heat boiler 14 is supplied to the absorption tower 22 of the $CO_2$ removal unit 20, or the bubble column reactor 30, after a condensate is separated and removed from the synthesis gas in the vapor-liquid separator 18. The absorption tower 22 absorbs a carbon dioxide gas included in the synthesis gas into the retained absorbent, to separate the carbon dioxide gas from the synthesis gas. The absorbent including the carbon dioxide gas within this absorption tower 22 is introduced into the regeneration tower 24, the absorbent including the carbon dioxide gas is heated and subjected to stripping treatment with, for example, a steam, and the resulting desorbed carbon dioxide gas is recycled sent to the reformer 12 from the regeneration tower 24, and is reused for the above reforming reaction.

The synthesis gas produced in the synthesis gas production unit 3 in this way is supplied to the bubble column reactor 30 of the above FT synthesis unit 5. At this time, the composition ratio of the synthesis gas supplied to the bubble column reactor 30 is adjusted to a composition ratio (for example, $H_2$:CO=2:1 (molar ratio)) suitable for the FT synthesis reaction. In addition, the pressure of the synthesis gas supplied to the bubble column reactor 30 is raised to a pressure (for example, about 3.6 MPaG) suitable for the FT synthesis reaction by a compressor (not shown) provided in a pipe which connects the $CO_2$ removal unit 20 with the bubble column reactor 30.

Additionally, a portion of the synthesis gas, the carbon dioxide gas of which has been separated by the above $CO_2$ removal unit 20, is also supplied to the hydrogen separator 26. The hydrogen separator 26 separates the hydrogen gas included in the synthesis gas, by the adsorption and desorption (hydrogen PSA) utilizing a pressure difference as described above. This separated hydrogen is continuously supplied from a gas holder (not shown), etc. via a compressor (not shown) to various hydrogen-utilizing reaction devices (for example, the desulfurizing reactor 10, the wax fraction hydrocracking reactor 50, the middle distillate hydrotreating reactor 52, the naphtha fraction hydrotreating reactor 54, etc.) which perform predetermined reactions, utilizing the hydrogen within the liquid fuel synthesizing system 1.

Next, the above FT synthesis unit 5 synthesizes liquid hydrocarbons by the FT synthesis reaction from the synthesis gas produced by the above synthesis gas production unit 3.

Specifically, the synthesis gas from which the carbon dioxide gas has been separated in the above $CO_2$ removal unit 20 flows in from the bottom of the bubble column reactor 30, and flows up in the catalyst slurry contained in the bubble column reactor 30. At this time, within the bubble column reactor 30, the carbon monoxide gas and hydrogen gas which are included in the synthesis gas react with each other by the FT synthesis reaction, thereby producing hydrocarbons. Moreover, by flowing water through the heat transfer pipe 32 of the bubble column reactor 30 at the time of this synthesis reaction, the reaction heat of the FT synthesis reaction is removed, and a portion of the water heated by this heat exchange is vaporized into a steam. In the steam and water, the water separated in the vapor-liquid separator 34 is returned to the heat transfer pipe 32, and a gas component is supplied to an external device as a medium-pressure steam (for example, 1.0 to 2.5 MPaG).

The liquid hydrocarbons synthesized in the bubble column reactor 30 in this way are drawn from the middle part of the bubble column reactor 30, and are introduced to the separator 36. The separator 36 separates the liquid hydrocarbons into a catalyst (solid component) in the drawn slurry, and a liquid component including a liquid hydrocarbon product. A portion of the separated catalyst is returned to the bubble column reactor 30, and the liquid component is supplied to the first fractionator 40. From the top of the bubble column reactor 30, an unreacted synthesis gas, and a gas component of the synthesized hydrocarbons are introduced into the vapor-liquid separator 38. The vapor-liquid separator 38 cools down these gases to separate some condensed liquid hydrocarbons to introduce them into the first fractionator 40. Meanwhile, as for the gas component separated in the vapor-liquid separator 38, the unreacted synthesis gases (CO and $H_2$) are returned to the bottom of the bubble column reactor 30, and are reused for the FT synthesis reaction. Additionally, the emission gas (flare gas) which is not a product and which contains, as a main component, hydrocarbon gas having a small carbon number ($C_4$ or less), may be used as fuel gas of the reformer 12, or may be introduced into an external combustion facility (not shown), be combusted therein, and then be emitted to the atmosphere.

Next, the first fractionator 40 heats the liquid hydrocarbons (the carbon numbers of which are various) supplied via the separator 36 and the vapor-liquid separator 38 from the bubble column reactor 30 as described above, to fractionally distill the liquid hydrocarbons using a difference in boiling points, i.e., separates and refines the liquid hydrocarbons into a naphtha fraction (the boiling point of which is lower than about 150° C.), a kerosene and gas oil fraction (a middle distillate (the boiling point of which is about 150 to 360° C.) equivalent to kerosene and gas oil), and a wax fraction (the boiling point of which is higher than about 360° C.). The liquid hydrocarbons (mainly $C_{21}$ or more) as the wax fraction drawn from the bottom of the first fractionator 40 are transferred to the wax fraction hydrocracking reactor 50, the liquid hydrocarbons (mainly $C_{11}$ to $C_{20}$) as the middle distillate equivalent to kerosene and gas oil drawn from the middle part of the first fractionator 40 are transferred to the middle distillate hydrotreating reactor 52, and the liquid hydrocarbons (mainly $C_5$ to $C_{10}$) as the naphtha fraction drawn from the top of the first fractionator 40 are transferred to the naphtha fraction hydrotreating reactor 54.

The wax fraction hydrocracking reactor 50 hydrocracks the liquid hydrocarbons as the wax fraction with a large carbon number (approximately $C_{21}$ or more), which has been supplied from the bottom of the first fractionator 40, by using the hydrogen gas supplied from the above hydrogen separator 26, to reduce the carbon number to $C_{20}$ or less. In this hydrocracking reaction, the wax fraction is converted into hydrocarbons with a small carbon number by cleaving C—C bonds of hydrocarbons with a large carbon number, using a catalyst and heat. A product including the liquid hydrocarbons hydrocracked in this wax fraction hydrocracking reactor 50 is separated into a gas and a liquid in the vapor-liquid separator 56, the liquid hydrocarbons of which are transferred to the second fractionator 70, and the gas component (including a hydrogen gas) of which is transferred to the middle distillate hydrotreating reactor 52 and the naphtha fraction hydrotreating reactor 54.

The middle distillate hydrotreating reactor 52 hydrotreats liquid hydrocarbons (approximately $C_{11}$ to $C_{20}$) as the middle distillate equivalent to kerosene and gas oil having a substantially middle carbon number, which have been supplied from the middle part of the first fractionator 40, by using the hydrogen gas supplied via the wax fraction hydrocracking reactor 50 from the hydrogen separator 26. This hydrotreating reaction is a reaction which adds hydrogen to unsaturated bonds of the above liquid hydrocarbons, to saturate the liquid hydrocarbons to produce saturated hydrocarbons and isomerize linear chain saturated hydrocarbons. As a result, a product including the hydrotreated liquid hydrocarbons is separated into a gas and a liquid in the vapor-liquid separator 58, the liquid hydrocarbons of which are transferred to the second fractionator 70, and the gas component (including hydrogen gas) of which is reused for the above hydrogenation reaction.

The naphtha fraction hydrotreating reactor 54 hydrotreats liquid hydrocarbons (approximately $C_{10}$ or less) as the naphtha fraction with a low carbon number, which have been supplied from the top of the first fractionator 40, by using the hydrogen gas supplied via the wax fraction hydrocracking reactor 50 from the hydrogen separator 26. As a result, a product including the hydrotreated liquid hydrocarbons is separated into a gas and a liquid in the vapor-liquid separator 60, the liquid hydrocarbons of which are transferred to the naphtha stabilizer 72, and the gas component (including a hydrogen gas) of which is reused for the above hydrogenation reaction.

Next, the second fractionator 70 distills the liquid hydrocarbons supplied from the wax fraction hydrocracking reactor 50 and the middle distillate hydrotreating reactor 52 as described above, thereby fractionally distilling the liquid hydrocarbons into hydrocarbons (the boiling point of which is lower than about 150° C.) with a carbon number of $C_{10}$ or less, kerosene (the boiling point of which is about 150 to 250° C.), gas oil (the boiling point of which is about 250 to 360° C.), and uncracked wax fraction (the boiling point of which is higher than about 360° C.) from the wax fraction hydrocracking reactor 50. The uncracked wax fraction is obtained from the bottom of the second fractionator 70, and this is recycled to the stage before the wax fraction hydrocracking reactor 50. Kerosene and gas oil are drawn from the middle part of the second fractionator 70. Meanwhile, hydrocarbon gases of $C_{10}$ or less are drawn from the top of the second fractionator 70, and are supplied to the naphtha stabilizer 72.

Moreover, the naphtha stabilizer 72 distills the hydrocarbons of $C_{10}$ or less, which have been supplied from the above naphtha fraction hydrotreating reactor 54 and second fractionator 70, and fractionally distills naphtha ($C_5$ to $C_{10}$) as a product. Accordingly, a high-purity naphtha is drawn from the bottom of the naphtha stabilizer 72. Meanwhile, the gas (flare gas) which is not a product and which contains as a main component hydrocarbons with a carbon number equal to or lower than a predetermined number (equal to or lower than $C_4$), is discharged from the top of the naphtha stabilizer 72. This gas may be used as the fuel gas of the reformer 12, may be recovered as LPG (not shown), and may be introduced into an external fuel facility (not shown), be combusted therein, and then be emitted to the atmosphere.

Next, the catalyst separation system 81 according to the present invention will be described in detail with reference to FIG. 2. The catalyst separation system 81 includes the bubble column reactor 30, the separator 36 which separates the synthesized liquid hydrocarbons and catalyst slurry, a gas-liquid separator 82 which is provided on the downstream side of the separator 36 to separate gas hydrocarbons and liquid hydrocarbons from the fluid including liquid hydrocarbons, which flows out of the separator, and a receiving tank 83 which first receives the liquid hydrocarbons and gas hydrocarbons separated by the gas-liquid separator 82.

The separator 36 includes a plurality of filters 91 arranged within the bubble column reactor 30. Ends of branch pipes 92 are connected to topu of the filters 91, and other ends of these branch pipes 92 run out to the outside of the reactor 30, and are connected to a header 94 formed in the shape of a ring. The header 94 is arranged above the filters 91 outside the bubble column reactor 30, and is arranged so that the center of the ring is made to coincide with the center of the bubble column reactor 30. Additionally, the internal diameter $D_1$ of a pipe of the header 94 is greater than the internal diameter $D_2$ of the branch pipes 92.

The liquid hydrocarbons including gas hydrocarbons filtered by the filters 91 pass through the branch pipes 92, and are transferred to the ring-shaped header 94. Here, the liquid hydrocarbons including gas hydrocarbons are introduced to the ring-shaped header 94 while being gradually separated into a gas and a liquid while passing through the branch pipes 92, and are completely separated into a gas and a liquid in the header.

In the ring-shaped header 94, one end of a liquid flowing line 96 through which the liquid hydrocarbons separated inside the header are transferred, and one end of a gas flowing line 97 through which the gas hydrocarbons separated inside the header are connected together. That is, the branch pipes 92, the ring-shaped header 94, the liquid flowing line 96, and the gas flowing line 97 constitute the gas-liquid separator 82. The other ends of the liquid flowing line 96 and gas flowing line 97 are connected to the receiving tank 83. The receiving tank 83 is connected to the first fractionator 40 via a liquid flowing line 98 and a gas flowing line 99.

Additionally, the branch pipes 92 branch on the way, and are connected to a tank 101 via communicating pipes 100. A line including this tank 101 is used to clean the filters 91. When valves 102 interposed in the communicating pipes 100 and held in a normally closed state are switched to "open", and valves 103 interposed in the branch pipes 92 and held in a normally opened state are switched to "close", the fluid stored within the tank 101 in advance flows towards the filters 91, whereby the filters 91 are cleaned. Such a cleaning method is called a reverse cleaning. Here, as long as the fluid stored within the tank 101 does not have an adverse effect on a catalyst, the fluid may be gas or liquid. The fluid may preferably be liquid (for example, liquid hydrocarbons).

Next, the operation of the catalyst separation system 81 will be described.

From the hydrocarbons synthesized within the bubble column reactor 30, catalyst slurry is separated by the filters 91 inside this reactor. The hydrocarbons from which the catalyst slurry has been separated pass through the branch pipes 92 while including the gas hydrocarbons. At this time, the hydrocarbons are flowed into the ring-shaped header 94 while being gradually separated into a gas and a liquid, and are completely separated into a gas and a liquid in this ring-shaped header 94.

Thereafter, the liquid hydrocarbons from which the gas hydrocarbons have been separated in the header 94 are transferred to the receiving tank 83 through the liquid flowing line 96. Further, the gas hydrocarbons separated from the liquid hydrocarbons in the header 94 are transferred to the receiving tank 83 through the gas flowing line 97. The liquid hydrocarbons and gas hydrocarbons which have been transferred to the receiving tank 83 exist in a separated manner being almost entirely unmixed within the receiving tank 83. The liquid hydrocarbons within the receiving tank 83 are transferred to the first fractionator 40 through the liquid flowing line 98, and the gas hydrocarbons within the receiving tank 83 are transferred to the first fractionator 40 through the gas flowing line 99.

As such, the liquid hydrocarbons including gas hydrocarbons separated by the filters 91 are separated into liquid hydrocarbons and gas hydrocarbons by the downstream gas-liquid separator 82, and are then transferred to the first fractionator 40 separately. Therefore, compared to a prior case where the hydrocarbons are transferred in a mixed vapor-liquid phase, volume does not expand during transfer, and pressure loss within a pipe for transfer can be minimized. As a result, the flow volume of the hydrocarbons can be secured as designed.

Second Embodiment

A second embodiment of a catalyst separation system according to the present invention will be described referring to FIG. 3. In addition, for convenience of description, the same components as those of the first embodiment will be designated by the same reference numerals, and the description thereof will be omitted.

Figure 3:
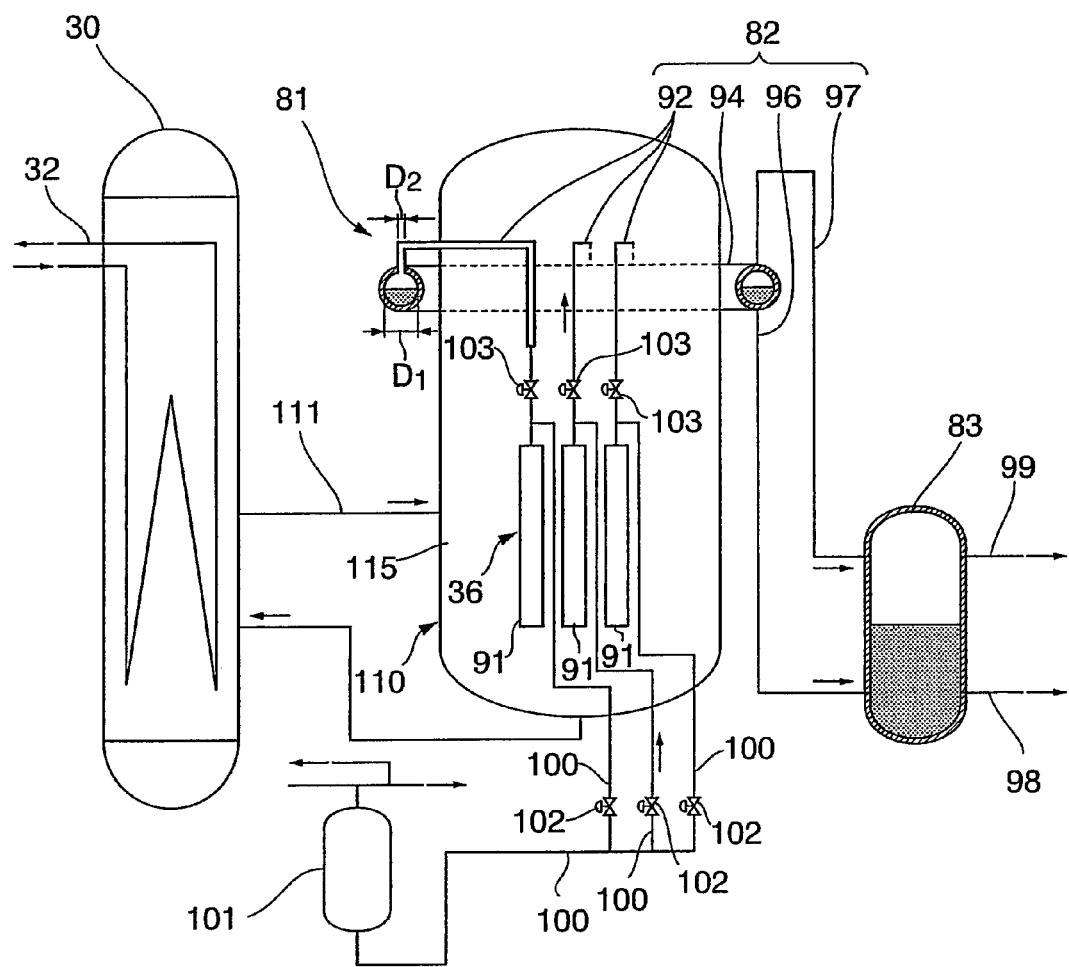
FIG. 3 is a schematic diagram showing the overall configuration of a catalyst separation system of a second embodiment of the present invention.

FIG. 3 is a schematic diagram showing the overall configuration of the catalyst separation system of the second embodiment of the present invention. In the first embodiment, the separator 36 that is a filter which separates the synthesized liquid hydrocarbons and catalyst slurry is an example of a so-called internal filtration type which is assembled into the bubble column reactor 30, whereas, in this second embodiment, a separator 110 that is a filter is an example of a so-called external filtration type which is arranged outside the bubble column reactor 30.

That is, the separator 110 is arranged through the communicating pipe 111 on the downstream of the bubble column reactor 30 separately from the bubble column reactor 30.

The separator 110 includes, for example, a cylindrical vessel 115, the top and bottom of which are closed, and a plurality of filters 91 disposed within the vessel 115. The filters 91 are connected to the endless 94 formed in the shape of a ring via the branch pipes 92. The header 94 is arranged above the filters 91 outside the vessel 115, and is arranged so that the center of the ring is made to coincide with the center of the vessel 115. In this embodiment, the internal diameter $D_1$ of a pipe of the header 94 is greater than the internal diameter $D_2$ of the branch pipes 92.

In this second embodiment, similarly to the first embodiment, the liquid hydrocarbons containing gas hydrocarbons separated by the filters 91 are separated into liquid hydrocarbons and gas hydrocarbons by the downstream gas-liquid separator 82, and are then transferred to the first fractionator 40 separately. Therefore, pressure loss within a pipe for a transfer can be minimized, and the flow volume of the hydrocarbons can be secured as designed.

Although the first and second embodiments of the present invention have been described hitherto in detail with reference to the drawings, concrete configurations are not limited to the embodiments, and the present invention also includes changes or the like in configuration without departing from the scope and spirit of the invention.

For example, in the above first and second embodiments, the ring-shaped header 94 is provided above and outside the vessel 30 or 115; however, this ring-shaped header 94 does not necessarily need to be arranged above and outside the vessel. For example, the header may be arranged below the vessel and may be arranged at a side of the vessel 30 or 115. Additionally, the header 94 is not limited to have a ring shape. For example, the header may have a cylindrical shape, a rectangular parallelepiped shape, or a cubical shape. In short, it is only necessary for the header to have the shape and internal capacity such that the liquid hydrocarbons including gas separated by the filters can be separated into a gas and a liquid, or separated hydrocarbons can be held as they are.

Additionally, although the example of the internal filtration type and the example of the external filtration type have been given and described in the first embodiment and the second embodiment, respectively, it is also possible to use them together.

INDUSTRIAL APPLICABILITY

The present invention relates to a catalyst separation system including a reactor where hydrocarbons are synthesized by a chemical reaction of a synthesis gas including carbon monoxide gas and hydrogen gas as main components, and a catalyst slurry having solid catalyst particles suspended in a liquid, filters which separate the hydrocarbons and the catalyst slurry, and a gas-liquid separator which separates the liquid hydrocarbons flowing out of the filters into gas hydrocarbons and liquid hydrocarbons.

According to the present invention, it is possible to minimize pressure loss, thereby securing a predetermined flow volume, when liquid hydrocarbons synthesized by the FT synthesis reaction are separated from catalyst slurry and transferred downstream.

REFERENCE SIGNS LIST

30: BUBBLE COLUMN REACTOR (REACTOR)
36: SEPARATOR (FILTER)
81: CATALYST SEPARATION SYSTEM
82: GAS-LIQUID SEPARATOR
83: RECEIVING TANK
91: FILTER
92: BRANCH PIPE
94: RING-SHAPED HEADER (COLLECTING PIPE)
96: LIQUID FLOWING LINE
97: GAS FLOWING LINE

The invention claimed is:

1. A catalyst separation system comprising:
a reactor for synthesis of hydrocarbons by a chemical reaction of a synthesis gas including carbon monoxide gas and hydrogen gas as main components in the presence of a catalyst slurry having solid catalyst particles suspended in a liquid;
filters for separating the hydrocarbons and the catalyst slurry; and
a gas-liquid separator for separating the hydrocarbons flowing out of the filters into gas hydrocarbons and liquid hydrocarbons,
wherein the gas-liquid separator comprises a plurality of branch pipes which extend from the filters and a collecting pipe which collects fluid flowing through the branch pipes,
wherein the collecting pipe has a diameter larger than the diameter of the branch pipes, and
wherein the collecting pipe is a ring-shaped header.

2. The catalyst separation system according to claim 1, wherein the chemical reaction is a Fischer-Tropsch synthesis reaction.

3. The catalyst separation system according to claim 1, wherein the header is arranged above the filters so that the center of the header coincides with the center of the reactor which houses the filters.

4. The catalyst separation system according to claim 1, further comprising a liquid flow line for transferring the liquid hydrocarbons separated within the ring-shaped header, and a gas flow line for transferring the gas hydrocarbons separated within the ring-shaped header, wherein the liquid flow line and the gas flow line are connected to the ring-shaped header.

5. The catalyst separation system according to claim 3, further comprising a liquid flow line for transferring the liquid hydrocarbons separated within the ring-shaped header, and a gas flow line for transferring the gas hydrocarbons separated within the ring-shaped header, wherein the liquid flow line and the gas flow line are connected to the ring-shaped header.

* * * * *

UNITED STATES PATENT AND TRADEMARK OFFICE
CERTIFICATE OF CORRECTION

PATENT NO.        : 8,524,160 B2
APPLICATION NO.   : 13/138637
DATED             : September 3, 2013
INVENTOR(S)       : Yasuhiro Onishi et al.

Page 1 of 1

It is certified that error appears in the above-identified patent and that said Letters Patent is hereby corrected as shown below:

In the Specification

Column 6, line 38, change "a the above" to -- the above --.

Signed and Sealed this
Twenty-sixth Day of August, 2014

Michelle K. Lee
*Deputy Director of the United States Patent and Trademark Office*